United States Patent
Hu et al.

(10) Patent No.: US 9,668,110 B2
(45) Date of Patent: May 30, 2017

(54) MBMS TECHNOLOGY-BASED EMERGENCY COMMUNICATION METHOD AND APPARATUS

(71) Applicant: Huawei Technologies Co., Ltd., Shenzhen (CN)

(72) Inventors: Zhenxing Hu, Beijing (CN); Fei Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 338 days.

(21) Appl. No.: 14/582,903

(22) Filed: Dec. 24, 2014

(65) Prior Publication Data
US 2015/0109989 A1    Apr. 23, 2015

Related U.S. Application Data

(63) Continuation of application No. PCT/CN2012/077962, filed on Jun. 29, 2012.

(51) Int. Cl.
H04W 4/06     (2009.01)
H04W 4/22     (2009.01)
(Continued)

(52) U.S. Cl.
CPC .............. *H04W 4/06* (2013.01); *H04W 4/22* (2013.01); *H04W 72/005* (2013.01); *H04L 12/189* (2013.01)

(58) Field of Classification Search
CPC .................................. H04W 4/06; H04W 4/22
See application file for complete search history.

(56) References Cited

U.S. PATENT DOCUMENTS

2008/0261554 A1* 10/2008 Keller .................. G08B 27/006
                                                                     455/404.1
2010/0178895 A1    7/2010 Maeda et al.
(Continued)

FOREIGN PATENT DOCUMENTS

CN      101640870 A    2/2010
CN      101656915 A    2/2010
(Continued)

OTHER PUBLICATIONS

"3rd Generation Partnership Project; Technical Specification Group Services and System Aspects; Multimedia Broadcast/Multicast Service (MBMS); Architecture and Functional Description (Release 11)," 3GPP TS 23.246 V11.1.0, Technical Specification, Mar. 2012, 66 pages.

*Primary Examiner* — Feben M Haile
(74) *Attorney, Agent, or Firm* — Slater Matsil, LLP

(57) ABSTRACT

The present invention is applicable to the field of communications and provides an MBMS technology-based emergency communication method and apparatus. The method includes: receiving information for establishing air interface bearer, where the information is sent by a terrestrial radio access network E-UTRAN/UTRAN, the information indicates that the air interface bearer has a highest scheduling priority and is not stopped and instructs a user equipment to monitor the air interface bearer in real time; establishing the air interface bearer with the E-UTRAN/UTRAN, and monitoring the air interface bearer in real time; and receiving emergency information that is sent by the E-UTRAN/UTRAN from the air interface bearer. Because the user equipment monitors the MBMS communication channel in real time, a second-level delay of MBMS communication is eliminated, so that MBMS technology-based communica- (Continued)

tion meets a delay requirement of emergency communication.

18 Claims, 4 Drawing Sheets

(51) Int. Cl.
   *H04W 72/00* (2009.01)
   *H04L 12/18* (2006.01)

(56) References Cited

U.S. PATENT DOCUMENTS

2011/0116433 A1\* 5/2011 Dorenbosch ........ H04W 72/005
                                                    370/312
2014/0177437 A1\* 6/2014 Korus ................... H04W 76/00
                                                    370/230

FOREIGN PATENT DOCUMENTS

| CN | 101690277 A | 3/2010 |
| CN | 101998280 A | 3/2011 |
| EP | 2166776 A1 | 3/2010 |
| WO | 2010123421 A1 | 10/2010 |

\* cited by examiner

MBMS TECHNOLOGY-BASED EMERGENCY COMMUNICATION METHOD AND APPARATUS

This application is a continuation of International Application No. PCT/CN2012/077962, filed on Jun. 29, 2012, which is hereby incorporated by reference in its entirety.

TECHNICAL FIELD

The present invention belongs to the field of communications, and in particular, to a multimedia b418roadcast/multicast MBMS technology-based emergency communication method and apparatus.

BACKGROUND

In an intelligent transport system, there is one kind of application, namely, an emergency alert, including a front accident alert, a front road passage alert, and so on; and such kind of application requires an end-to-end delay at one hundred millisecond level, so as to enable more vehicles to avoid a danger, improve travel safety, and reduce or avoid loss of life and property.

A current technology mainly uses short-distance communications, such as DSRC (Dedicated Short Range Communications), to solve the foregoing problem. Emergency alert notification is implemented through communication and forwarding between vehicles; however, the method requires that an extra short-range communication module is added on all vehicles; and therefore, communication cannot be ensured and a requirement is imposed on a communication distance, or emergency alert notification is implemented through communication and forwarding between a vehicle and a roadside device; however, in order to ensure a short delay of an emergency alert at each point, a great number of roadside devices need to be deployed, thereby resulting in a high cost.

SUMMARY

An objective of embodiments of the present invention is to provide an MBMS technology-based emergency communication method and apparatus, so as to achieve objectives of simplifying a structure of a communication device, reducing a cost, and reducing a communication delay.

In one aspect, an MBMS technology-based emergency communication method is provided and includes receiving information for establishing an air interface bearer. The information is sent by a terrestrial radio access network E-UTRAN/UTRAN, the air interface bearer is an air interface bearer established by the E-UTRAN/UTRAN for a multimedia broadcast/multicast MBMS communication channel. The information indicates that the air interface bearer has a highest scheduling priority and is not to be stopped and instructs a user equipment to monitor the air interface bearer in real time. The MBMS communication channel is an MBMS communication channel initiated by a broadcast/multicast service center BM-SC. The method further includes establishing the air interface bearer with the E-UTRAN/UTRAN, and monitoring the air interface bearer in real time. Emergency information that is sent by the E-UTRAN/UTRAN from the air interface bearer is received. The emergency information is emergency information sent by a multimedia broadcast/multicast gateway MBMS-GW to the E-UTRAN/UTRAN through the MBMS communication channel.

In one aspect, another MBMS technology-based emergency communication method is provided and includes sending information for establishing a multimedia broadcast/multicast MBMS communication channel to a user equipment. The information indicates that the MBMS communication channel has a highest scheduling priority and is not to be stopped and instructs the user equipment to monitor the MBMS communication channel in real time. The method further includes receiving emergency information sent by an intelligent transport system ITS-server, and sending the emergency information to a multimedia broadcast/multicast gateway MBMS-GW. The emergency information is emergency information sent by the user equipment to the ITS-server.

In one aspect, another MBMS technology-based emergency communication method is provided and includes the following steps receiving information for establishing a multimedia broadcast/multicast MBMS communication channel. The information is sent by a broadcast/multicast service center BM-SC, and the information indicates that the MBMS communication channel has a highest scheduling priority and is not to be stopped and instructs a user equipment to monitor the MBMS communication channel in real time. The method further includes sending information for establishing an air interface bearer to the user equipment, and establishing the air interface bearer with the user equipment for the MBMS communication channel. When emergency information is received, sending the emergency information to the user equipment through the air interface bearer.

In one aspect, an MBMS technology-based communication apparatus is provided and includes a receiving unit configured to receive information for establishing an air interface bearer. The information is sent by a terrestrial radio access network E-UTRAN/UTRAN. The air interface bearer is an air interface bearer established by the E-UTRAN/UTRAN for a multimedia broadcast/multicast (MBMS) communication channel. The information indicates that the air interface bearer has a highest scheduling priority and is not to be stopped and instructs a user equipment to monitor the air interface bearer in real time. The MBMS communication channel is an MBMS communication channel initiated by a broadcast/multicast service center BM-SC. An establishing unit is configured to establish the air interface bearer with the E-UTRAN/UTRAN according to the information for establishing the air interface bearer, where the information is received by the receiving unit. A monitoring unit is configured to monitor, in real time, the air interface bearer established by the establishing unit. An emergency information receiving unit is configured to receive, according to the monitoring of the monitoring unit, emergency information that is sent by the E-UTRAN/UTRAN from the air interface bearer. The emergency information is emergency information sent by a multimedia broadcast/multicast gateway MBMS-GW to the E-UTRAN/UTRAN through the MBMS communication channel.

In one aspect, another MBMS technology-based communication apparatus is provided and includes a sending unit configured to send information for establishing a MBMS communication channel to a user equipment. The information indicates that the MBMS communication channel has a highest scheduling priority and is not to be stopped and instructs the user equipment to monitor the MBMS communication channel in real time. A receiving unit is configured to receive emergency information sent by an intelligent transport system ITS-server. The emergency information is emergency information sent by the user equipment to the ITS-server. An emergency information sending unit is configured to send the emergency information to a multimedia broadcast/multicast gateway MBMS-GW.

In one aspect, another MBMS technology-based communication apparatus is provided and includes a receiving unit configured to receive information for establishing a multimedia broadcast/multicast MBMS communication channel. The information is sent by a broadcast/multicast service center BM-SC, and the information indicates that the MBMS communication channel has a highest scheduling priority and is not to be stopped and instructs a user equipment to monitor the MBMS communication channel in real time. A sending unit is configured to send information for establishing an air interface bearer to the user equipment. An air interface bearer establishing unit is configured to establish the air interface bearer with the user equipment for the MBMS communication channel. An emergency information sending unit is configured to send the emergency information to the user equipment through the air interface bearer when emergency information is received.

A user equipment receives information for establishing an MBMS communication channel, where the information is sent by a network side device, establishes the MBMS communication channel according to the information, monitors the MBMS communication channel in real time, and acquires emergency information that is sent by the network side device through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated, so that MBMS technology-based communication meets a delay requirement of emergency communication.

DETAILED DESCRIPTION OF ILLUSTRATIVE EMBODIMENTS

To make the objectives, technical solutions, and advantages of the present invention more comprehensible, the following describes the present invention in further detail with reference to the accompanying drawings and embodiments. It is understandable that specific embodiments described herein are only used to explain the present invention but are not intended to limit the present invention.

In the embodiments of the present invention, a user equipment receives information for establishing an MBMS communication channel, where the information is sent by a network side device, establishes the MBMS communication channel according to the information, monitors the MBMS communication channel in real time, and acquires emergency information that is sent by the network side device through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated, so that MBMS technology-based communication meets a delay requirement of emergency communication.

Figure 1:
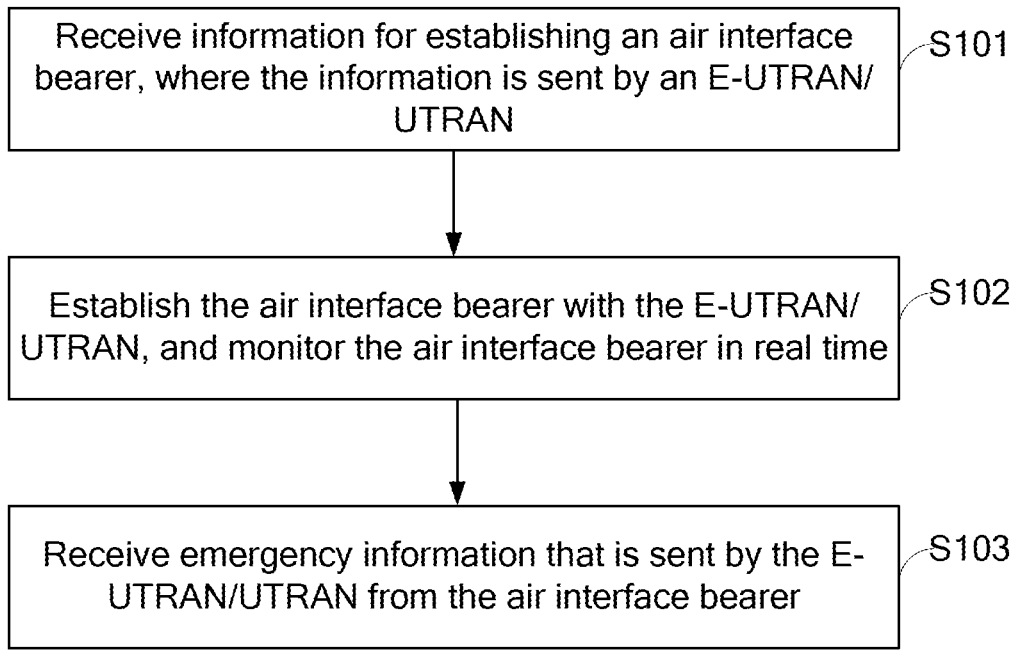
FIG. 1 is a flow chart of an MBMS technology-based emergency communication method according to an embodiment of the present invention.

FIG. 1 is a flow chart of an MBMS technology-based emergency communication method according to an embodiment of the present invention. The method includes the following steps.

In step S101, receive information for establishing an air interface bearer, where the information is sent by a terrestrial radio access network E-UTRAN/UTRAN, the air interface bearer is an air interface bearer established by the E-UTRAN/UTRAN for a multimedia broadcast/multicast MBMS communication channel, the information indicates that the air interface bearer has a highest scheduling priority and is not stopped and instructs a user equipment to monitor the air interface bearer in real time, and the MBMS communication channel is an MBMS communication channel initiated by a broadcast/multicast service center BM-SC.

In the embodiment of the present invention, the user equipment receives information for establishing the MBMS communication channel, where the information is sent by the BM-SC; and when the BM-SC sends the information for establishing the MBMS communication channel to the E-UTRAN/UTRAN, the E-UTRAN/UTRAN sends the information for establishing the air interface bearer to the user equipment and establishes the air interface bearer with the user equipment for the MBMS communication channel, where the air interface bearer has a highest usage priority and in any situation, the air interface bearer is not stopped, and at the same time, the information instructs the user equipment to monitor the air interface bearer in real time. In this way, in a subsequent operation, the user equipment monitors the air interface bearer, which is equivalent to monitoring the MBMS communication channel.

In step S102, establish the air interface bearer with the E-UTRAN/UTRAN, and monitor the air interface bearer in real time.

In the embodiment of the present invention, after receiving the information for establishing the air interface bearer, the user equipment establishes the air interface bearer with the E-UTRAN/UTRAN, and monitors the air interface bearer in real time according to an instruction of the information or monitors the air interface bearer according to a certain period. By monitoring the air interface bearer in real time (which is equivalent to monitoring the MBMS communication channel), a second-level delay in an establishment process of the MBMS communication channel and a second-level delay of the MBMS communication channel when a service is delivered can be eliminated.

In step S103, receive emergency information that is sent by the E-UTRAN/UTRAN from the air interface bearer, where the emergency information is emergency information sent by a multimedia broadcast/multicast gateway MBMS-GW to the E-UTRAN/UTRAN through the MBMS communication channel.

In the embodiment of the present invention, the user equipment monitors the air interface bearer in real time, and acquires the emergency information that is sent by the MBMS-GW through the air interface bearer. The user equipment acquires the emergency information by monitoring a PDCCH scrambled by an RNTI, where the RNTI is a dedicated RNTI configured by a network side device for information that is sent through the MBMS communication channel.

As an optional embodiment of the present invention, the method in the present invention further includes uploading the emergency information when an emergency situation occurs.

In the embodiment of the present invention, when an emergency situation occurs to the user equipment, the user equipment uploads the emergency information to the MBMS-GW, so that the MBMS-GW sends the emergency information to another user equipment through the MBMS communication channel. Specifically, a method for uploading the emergency information includes: sending the emergency information to an MME, so that the MME sends the emergency information to the MBMS-GW. Alternatively, the emergency information is sent to an ITS-server, so that the ITS-server sends the emergency information to the BM-SC and the BM-SC sends the emergency information to the MBMS-GW.

In the embodiment of the present invention, a user equipment receives information for establishing an MBMS communication channel, where the information is sent by a network side device, establishes the MBMS communication channel according to the information, monitors the MBMS communication channel in real time, and acquires emergency information that is sent by the network side device through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated, so that MBMS technology-based communication meets a delay requirement of emergency communication.

Figure 2:
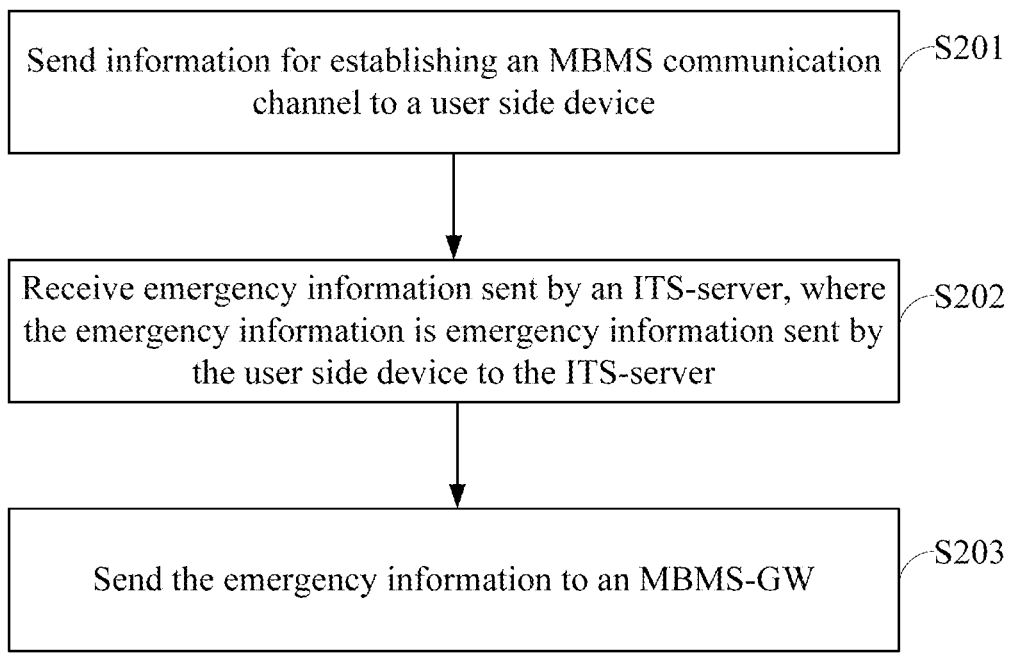
FIG. 2 is a flow chart of an MBMS technology-based communication method according to another embodiment of the present invention.

FIG. 2 is a flow chart of an MBMS technology-based communication method according to another embodiment of the present invention. The method includes the following steps:

In step S201, send information for establishing an MBMS communication channel to a user equipment, where the information indicates that the MBMS communication channel has a highest scheduling priority and is not stopped and instructs the user equipment to monitor the MBMS communication channel in real time.

In the embodiment of the present invention, a BM-SC sends the information for establishing the MBMS communication channel to the user equipment, where the information indicates that the MBMS communication channel has a highest usage priority and in any situation, the MBMS communication channel is not stopped, and at the same time, the information instructs the user equipment to monitor the MBMS communication channel in real time. The implementation procedure is specifically as follows:

The information for establishing the MBMS communication channel is sent to an MBMS-GW, so that the MBMS-GW subsequently sends the information for establishing the MBMS communication channel to the user equipment, and an indication IE or a reserved special TMGI is added in the information for establishing the MBMS communication channel to indicate that the MBMS communication channel has the highest scheduling priority and is not stopped and instruct the user equipment to monitor the MBMS communication channel in real time.

In step S202, receive emergency information sent by an intelligent transport system ITS-server, where the emergency information is emergency information sent by the user equipment to the ITS-server.

In step S203, send the emergency information to the MBMS-GW.

In the embodiment of the present invention, the BM-SC sends, to the MBMS-GW, the emergency information received from the ITS-server, so that the MBMS-GW sends the emergency information to the user equipment through the MBMS communication channel.

In the embodiment of the present invention, a network side device sends information for establishing an MBMS communication channel to a user equipment, instructs the user equipment to establish, through the MBMS communication channel, a connection with the network side device, instructs the user equipment to monitor the MBMS communication channel in real time, and sends emergency information to the user equipment through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated.

Figure 3:
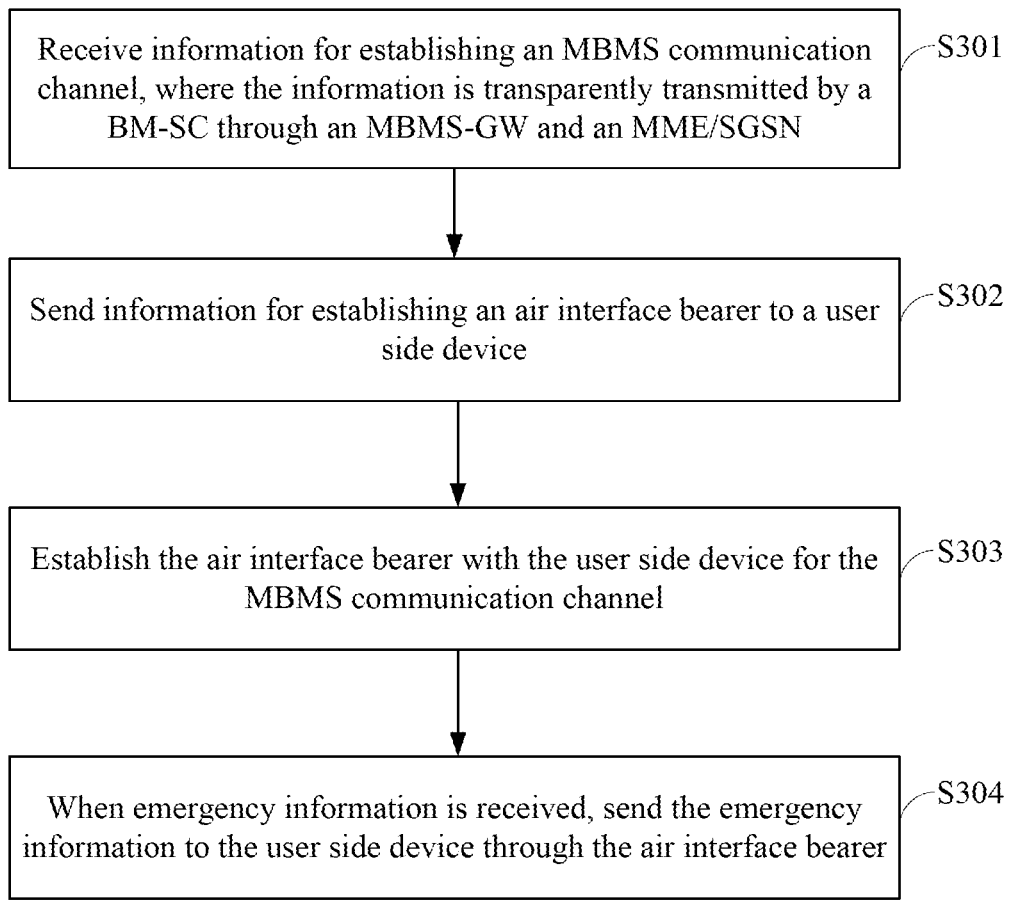
FIG. 3 is a flow chart of an MBMS technology-based emergency communication method according to still another embodiment of the present invention.

FIG. 3 is a flow chart of an MBMS technology-based emergency communication method according to still another embodiment of the present invention. The method includes the following steps.

In step S301, receive information for establishing a multimedia broadcast/multicast MBMS communication channel, where the information is sent by a BM-SC, and the information indicates that the MBMS communication channel has a highest scheduling priority and is not stopped and instructs a user equipment to monitor the MBMS communication channel in real time.

In the embodiment of the present invention, an E-UTRAN/UTRAN receives the information for establishing the MBMS communication channel, where the information is sent by the BM-SC, and the information is forwarded by an MBMS-GW and an MME/SGSN in a sending process; and after receiving the information, the E-UTRAN/UTRAN establishes a necessary air interface bearer for the information.

In step S302, send information for establishing an air interface bearer to the user equipment.

In step S303, establish the air interface bearer with the user equipment for the MBMS communication channel.

In step S304, when emergency information is received, send the emergency information to the user equipment through the air interface bearer.

In the embodiment of the present invention, a network side device sends information for establishing an MBMS communication channel to a user equipment, instructs the user equipment to establish, through the MBMS communication channel, a connection with the network side device, instructs the user equipment to monitor the MBMS communication channel in real time, and sends emergency information to the user equipment through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated.

Figure 4:
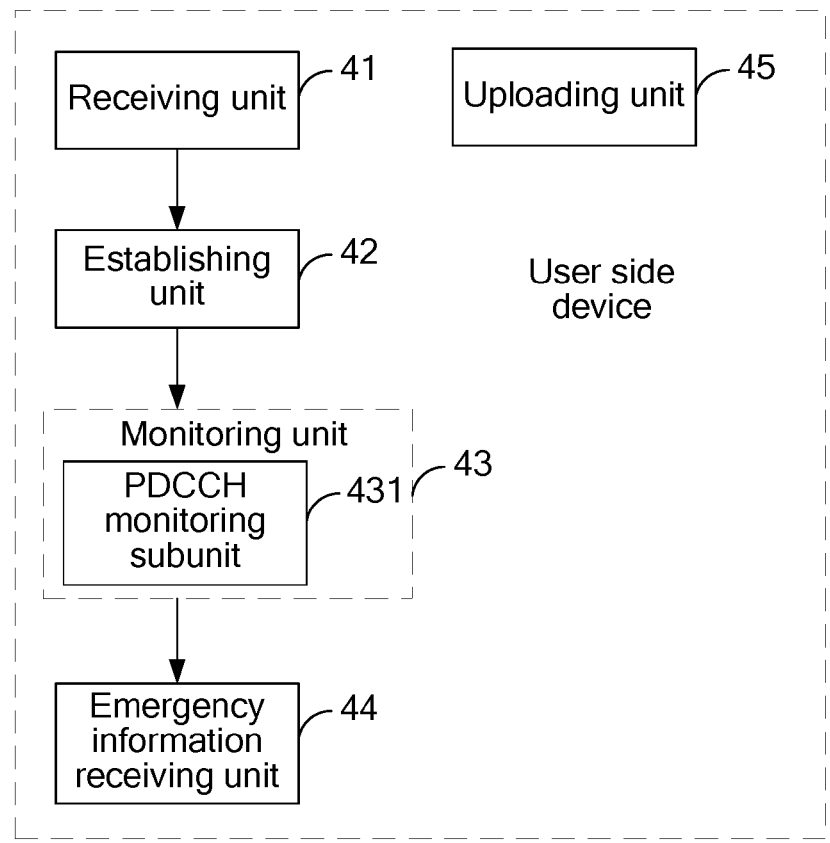
FIG. 4 is a structural diagram of an MBMS technology-based communication apparatus according to an embodiment of the present invention.

FIG. 4 is a structural diagram of an MBMS technology-based communication apparatus according to an embodiment of the present invention, and to facilitate the description, merely shows a part related to the embodiment of the present invention. The apparatus includes the following units.

A receiving unit 41 is configured to receive information for establishing an air interface bearer, where the information is sent by a terrestrial radio access network E-UTRAN/UTRAN, the air interface bearer is an air interface bearer established by the E-UTRAN/UTRAN for a multimedia broadcast/multicast MBMS communication channel, the information indicates that the air interface bearer has a highest scheduling priority and is not stopped and instructs a user equipment to monitor the air interface bearer in real time, and the MBMS communication channel is an MBMS communication channel initiated by a broadcast/multicast service center BM-SC.

In the embodiment of the present invention, the receiving unit 41 receives information for establishing the MBMS communication channel, where the information is sent by the BM-SC; and when the BM-SC sends the information for establishing the MBMS communication channel to the E-UTRAN/UTRAN, the E-UTRAN/UTRAN sends the information for establishing the air interface bearer to the user equipment and establishes the air interface bearer with the user equipment for the MBMS communication channel, where the air interface bearer has a highest usage priority and in any situation, the air interface bearer is not stopped, and at the same time, the information instructs the user equipment to monitor the air interface bearer in real time. In this way, in a subsequent operation, the user equipment monitors the air interface bearer, which is equivalent to monitoring the MBMS communication channel.

An establishing unit 42 is configured to establish the air interface bearer with the E-UTRAN/UTRAN according to the information for establishing the air interface bearer, where the information is received by the receiving unit 41.

A monitoring unit 43 is configured to monitor, in real time, the air interface bearer established by the establishing unit 42.

In the embodiment of the present invention, after the receiving unit 41 receives the information for establishing the air interface bearer, the establishing unit 42 establishes the air interface bearer with the E-UTRAN/UTRAN, and the monitoring unit monitors the air interface bearer in real time according to an instruction of the information or monitors the air interface bearer according to a certain period. By monitoring the air interface bearer in real time (which is equivalent to monitoring the MBMS communication channel), a second-level delay in an establishment process of the MBMS communication channel and a second-level delay of the MBMS communication channel when a service is delivered can be eliminated. The monitoring unit 43 specifically includes a PDCCH monitoring subunit 431, configured to monitor a PDCCH scrambled by an RNTI, so as to acquire emergency information, where the RNTI is a dedicated RNTI configured by a network side device for information that is sent through the MBMS communication channel.

An emergency information receiving unit 44 is configured to receive, according to the monitoring of the monitoring unit 43, emergency information that is sent by the E-UTRAN/UTRAN from the air interface bearer, where the emergency information is emergency information sent by a multimedia broadcast/multicast gateway MBMS-GW to the E-UTRAN/UTRAN through the MBMS communication channel.

In the embodiment of the present invention, the emergency information receiving unit 44 receives, according to the monitoring of the monitoring unit 43, the emergency information that is sent by the E-UTRAN/UTRAN from the air interface bearer.

As an optional embodiment of the present invention, the apparatus further includes an uploading unit 45 configured to upload the emergency information when an emergency situation occurs.

In the embodiment of the present invention, when an emergency situation occurs to the user equipment, the uploading unit 45 uploads the emergency information to the MBMS-GW, so that the MBMS-GW sends the emergency information to another user equipment through the MBMS communication channel. Specifically, the uploading unit 45 includes an MME sending subunit 451 configured to send the emergency information to an MME, so that the MME sends the emergency information to the MBMS-GW. Alternatively, an ITS-server sending subunit 452 is configured to send the emergency information to an ITS-server, so that the ITS-server sends the emergency information to the BM-SC and the BM-SC sends the emergency information to the MBMS-GW.

In the embodiment of the present invention, a user equipment receives information for establishing an MBMS communication channel, where the information is sent by a network side device, establishes the MBMS communication channel according to the information, monitors the MBMS communication channel in real time, and acquires emergency information that is sent by the network side device through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated.

Figure 5:
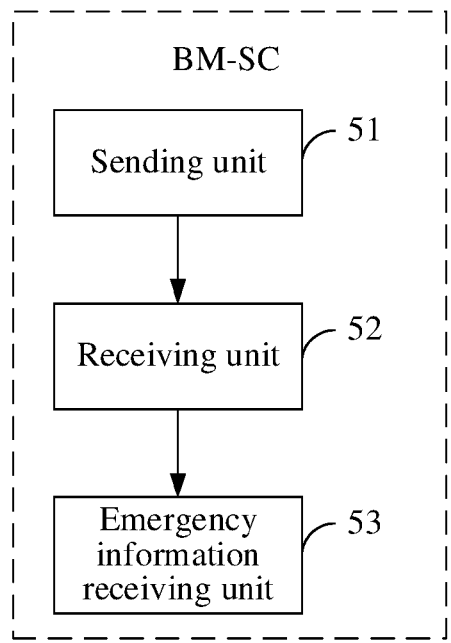
FIG. 5 is a structural diagram of an MBMS technology-based communication apparatus according to another embodiment of the present invention.

FIG. 5 is a structural diagram of an MBMS technology-based communication apparatus according to another embodiment of the present invention, and to facilitate the description, merely shows a part related to the embodiment of the present invention. The apparatus includes the following units.

A sending unit 51 is configured to send information for establishing an MBMS communication channel to a user equipment. The information indicates that the MBMS communication channel has a highest scheduling priority and is not stopped and instructs the user equipment to monitor the MBMS communication channel in real time.

In the embodiment of the present invention, the sending unit 51 sends the information for establishing the MBMS communication channel to the user equipment, where the information indicates that the MBMS communication channel has a highest usage priority and in any situation, the MBMS communication channel is not stopped, and at the same time, the information instructs the user equipment to monitor the MBMS communication channel in real time. Specifically, the sending unit 51 adds an indication IE or a reserved special TMGI in the information for establishing the MBMS communication channel to indicate that the MBMS communication channel has the highest scheduling priority and is not stopped and instruct the user equipment to monitor the MBMS communication channel in real time.

A receiving unit 52 is configured to receive emergency information sent by an intelligent transport system ITS-server, where the emergency information is emergency information sent by the user equipment to the ITS-server.

In the embodiment of the present invention, the receiving unit 52 receives the emergency information sent by the ITS-server, where the emergency information is emergency information reported by the user equipment to the ITS-server.

An emergency information sending unit 53 is configured to send the emergency information to an MBMS-GW.

In the embodiment of the present invention, the emergency information sending unit 53 sends, to the user equipment through the MBMS communication channel, the emergency information received by the receiving unit 52. Because the user equipment monitors the MBMS communication channel in real time, the user equipment can quickly acquire the emergency information.

In the embodiment of the present invention, a network side device sends information for establishing an MBMS communication channel to a user equipment, instructs the user equipment to establish, through the MBMS communication channel, a connection with the network side device, instructs the user equipment to monitor the MBMS communication channel in real time, and sends emergency information to the user equipment through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated.

Figure 6:
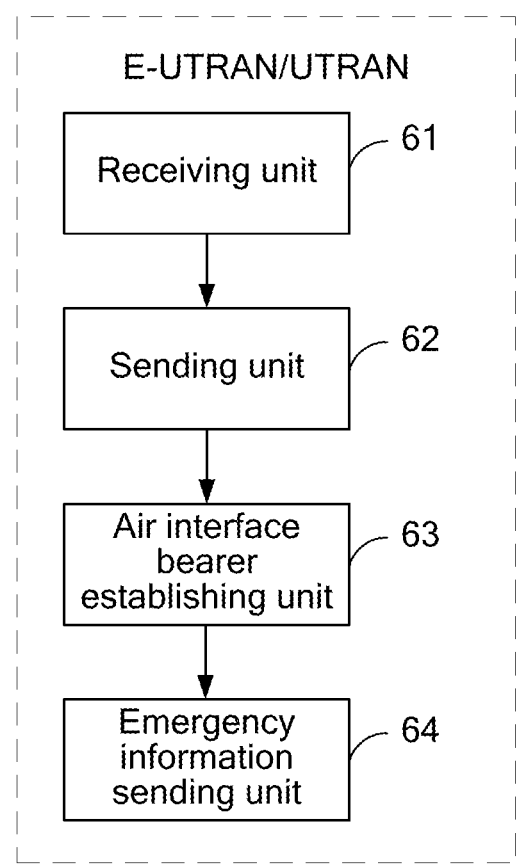
FIG. 6 is a structural diagram of an MBMS technology-based emergency communication apparatus according to still another embodiment of the present invention.

FIG. 6 is a structural diagram of an MBMS technology-based emergency communication apparatus according to still another embodiment of the present invention, and to facilitate the description, merely shows a part related to the embodiment of the present invention. The apparatus includes:

A receiving unit 61 is configured to receive information for establishing an MBMS communication channel, where the information is sent by a BM-SC, and the information indicates that the MBMS communication channel has a highest scheduling priority and is not stopped and instructs a user equipment to monitor the MBMS communication channel in real time.

In the embodiment of the present invention, an E-UTRAN/UTRAN receives the information for establishing the MBMS communication channel, where the information is sent by the BM-SC, and the information is transparently transmitted by an MBMS-GW and an MME/SGSN in a sending process.

A sending unit 62 is configured to send information for establishing an air interface bearer to the user equipment.

An air interface bearer establishing unit 63 is configured to establish the air interface bearer with the user equipment for the MBMS communication channel.

An emergency information sending unit 64 is configured to: when emergency information is received, send the emergency information to the user equipment through the air interface bearer.

In the embodiment of the present invention, a network side device sends information for establishing an MBMS communication channel to a user equipment, instructs the user equipment to establish, through the MBMS communication channel, a connection with the network side device, instructs the user equipment to monitor the MBMS communication channel in real time, and sends emergency information to the user equipment through the MBMS communication channel. Because the user equipment monitors the MBMS communication channel in real time, processes of establishing an MBMS communication channel and delivering an MBMS service in an MBMS technology are omitted, and then a second-level delay in an establishment process of an MBMS communication channel and a second-level delay of the MBMS communication channel when a service is delivered are eliminated.

The foregoing descriptions are merely exemplary embodiments of the present invention, but are not intended to limit the present invention. Any modification, equivalent replacement, and improvement made within the spirit and principle of the present invention shall all fall within the protection scope of the present invention.

It should be noted that, in the foregoing apparatus embodiments of a user equipment and a base station, the unit division is merely logical function division but is not limited to the foregoing division, as long as corresponding functions can be implemented. In addition, specific names of the functional units are merely for facilitating differentiation between each other and are not intended to limit the protection scope of the present invention.

In addition, a person of ordinary skill in the art may understand that, all or a part of the steps in the foregoing method embodiments may be implemented by a program instructing relevant hardware, a corresponding program may be stored in a computer readable storage medium, and the foregoing storage medium may a read only memory, a magnetic disk, an optical disc, or the like.

The foregoing descriptions are merely exemplary specific embodiments of the present invention, but are not intended to limit the protection scope of the present invention. Any variation or replacement that may be easily figured out by a person skilled in the art within the technical scope disclosed in the embodiments of the present invention shall all fall within the protection scope of the present invention. Therefore, the protection scope of the present invention shall be subject to the protection scope of the claims.

What is claimed is:

1. A multimedia broadcast/multicast (MBMS) technology-based emergency communication method, the method comprising:

receiving information for establishing an air interface bearer, wherein the information is sent by a terrestrial radio access network (E-UTRAN/UTRAN), wherein the air interface bearer is an air interface bearer established by the E-UTRAN/UTRAN for a MBMS communication channel, wherein the information indicates that the air interface bearer has a highest scheduling priority and is not stopped and instructs a user equipment to monitor the air interface bearer in real time, and wherein the MBMS communication channel is an MBMS communication channel initiated by a broadcast/multicast service center (BM-SC);
establishing the air interface bearer with the E-UTRAN/UTRAN, and monitoring the air interface bearer in real time; and
receiving emergency information that is sent by the E-UTRAN/UTRAN from the air interface bearer, wherein the emergency information is sent by a multimedia broadcast/multicast gateway (MBMS-GW) to the E-UTRAN/UTRAN through the MBMS communication channel.

2. The method according to claim 1, further comprising:
when an emergency situation occurs, sending the emergency information to an MME, so that the MME sends the emergency information to the MBMS-GW.

3. The method according to claim 1, further comprising:
when an emergency situation occurs, sending the emergency information to an intelligent transport system, ITS-server, so that the ITS-server sends the emergency information to the BM-SC and the BM-SC sends the emergency information to the MBMS-GW.

4. The method according to claim 1, wherein the receiving emergency information comprises:
acquiring the emergency information by monitoring a physical downlink control channel PDCCH scrambled by a radio network temporary identifier (RNTI), wherein the RNTI is a dedicated RNTI configured by a network side device for information that is sent through the MBMS communication channel.

5. The method according to claim 1, wherein an indication IE or a reserved temporary mobile group identity (TMGI) is added in information for establishing the MBMS communication channel to indicate that the MBMS communication channel has the highest scheduling priority and is not to be stopped and instruct the user equipment to monitor the MBMS communication channel in real time.

6. The method according to claim 1, wherein the information for establishing the air interface bearer instructs the user equipment to periodically monitor the air interface bearer.

7. A multimedia broadcast/multicast (MBMS) technology-based emergency communication method, comprising:
sending information for establishing a MBMS communication channel to a user equipment, wherein the sent information indicates that the MBMS communication channel has a highest scheduling priority and is not to be stopped and instructs the user equipment to monitor the MBMS communication channel in real time;
receiving emergency information sent by an intelligent transport system (ITS-server), wherein the emergency information is sent by the user equipment to the ITS-server; and
sending the emergency information to a multimedia broadcast/multicast gateway (MBMS-GW).

8. The method according to claim 7, wherein an emergency service channel indication (IE) or a reserved temporary mobile group identity (TMGI) is added in the information for establishing the MBMS communication channel to indicate that the MBMS communication channel has the highest scheduling priority and is not to be stopped and instruct the user equipment to monitor the MBMS communication channel in real time.

9. A multimedia broadcast/multicast (MBMS) technology-based emergency communication method, comprising the following steps:
receiving information for establishing a MBMS communication channel, wherein the information is sent by a broadcast/multicast service center (BM-SC), and wherein the information indicates that the MBMS communication channel has a highest scheduling priority and is not to be stopped and instructs a user equipment to monitor the MBMS communication channel in real time;
sending information for establishing an air interface bearer to the user equipment;
establishing the air interface bearer with the user equipment for the MBMS communication channel; and
when emergency information is received, sending the emergency information to the user equipment through the air interface bearer.

10. A multimedia broadcast/multicast (MBMS) technology-based communication apparatus comprising:
a processor;
a memory storing a program to be executed in the processor, the program comprising instructions for:
receiving information for establishing an air interface bearer, wherein the information is sent by a terrestrial radio access network (E-UTRAN/UTRAN), wherein the air interface bearer is an air interface bearer established by the E-UTRAN/UTRAN for a MBMS communication channel, wherein the information indicates that the air interface bearer has a highest scheduling priority and is not to be stopped and instructs a user equipment to monitor the air interface bearer in real time, and wherein the MBMS communication channel is an MBMS communication channel initiated by a broadcast/multicast service center (BM-SC);
establishing the air interface bearer with the E-UTRAN/UTRAN according to the information for establishing the air interface bearer;
monitoring, in real time, the air interface bearer; and
receiving, according to the monitoring, emergency information that is sent by the E-UTRAN/UTRAN from the air interface bearer, wherein the emergency information is sent by a multimedia broadcast/multicast gateway (MBMS-GW) to the E-UTRAN/UTRAN through the MBMS communication channel.

11. The communication apparatus according to claim 10, wherein the program comprises further instructions for:
sending the emergency information to an MME when an emergency situation occurs, so that the MME sends the emergency information to the MBMS-GW.

12. The communication apparatus according to claim 10, wherein the program comprises further instructions for:
sending the emergency information to an intelligent transport system (ITS-server) when an emergency situation occurs, so that the ITS-server sends the emergency information to the BM-SC and the BM-SC sends the emergency information to the MBMS-GW.

13. The apparatus according to claim 10, wherein the instructions for the monitoring comprises instructions for:
monitoring a physical downlink control channel (PDCCH) scrambled by an RNTI, so as to acquire the emergency information, wherein the RNTI is a dedicated RNTI configured by a network side device for information that is sent through the MBMS communication channel.

14. The apparatus according to claim 10, wherein an indication (IE) or a reserved temporary mobile group identity (TMGI) is added in information for establishing the MBMS communication channel to indicate that the MBMS communication channel has the highest scheduling priority and is not to be stopped and instruct the user equipment to monitor the MBMS communication channel in real time.

15. The apparatus according to claim 10, wherein the information for establishing the air interface bearer instructs the user equipment to periodically monitor the air interface bearer.

16. A multimedia broadcast/multicast (MBMS) technology-based communication apparatus, comprising:
- a sending unit configured to send information for establishing a MBMS communication channel to a user equipment, wherein the information indicates that the MBMS communication channel has a highest scheduling priority and is not to be stopped and instructs the user equipment to monitor the MBMS communication channel in real time;
- a receiving unit configured to receive emergency information sent by an intelligent transport system (ITS-server), wherein the emergency information is emergency information sent by the user equipment to the ITS-server; and
- an emergency information sending unit configured to send the emergency information to a multimedia broadcast/multicast gateway (MBMS-GW).

17. The apparatus according to claim 16, wherein an emergency service channel indication indication (IE) or a reserved temporary mobile group identity (TMGI) is added into the information for establishing the MBMS communication channel to indicate that the MBMS communication channel has the highest scheduling priority and is not to be stopped and instruct the user equipment to monitor the MBMS communication channel in real time.

18. A multimedia broadcast/multicast (MBMS) technology-based communication apparatus comprising:
- a processor;
- a memory storing a program to be executed in the processor, the program comprising instructions for:
  - receiving information for establishing a MBMS communication channel, wherein the information is sent by a broadcast/multicast service center (BM-SC), and wherein the information indicates that the MBMS communication channel has a highest scheduling priority and is not to be stopped and instructs a user side device to monitor the MBMS communication channel in real time;
  - sending information for establishing an air interface bearer to the user side device;
  - establishing the air interface bearer with the user side device for the MBMS communication channel; and
  - sending an emergency information to the user side device through the air interface bearer when the emergency information is received.

* * * * *